United States Patent
Matsumoto

(10) Patent No.: US 11,537,059 B2
(45) Date of Patent: Dec. 27, 2022

(54) IMAGE FORMING DEVICE

(71) Applicant: SHARP KABUSHIKI KAISHA, Sakai (JP)

(72) Inventor: Kazutaka Matsumoto, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/464,578

(22) Filed: Sep. 1, 2021

(65) Prior Publication Data
US 2022/0100116 A1 Mar. 31, 2022

(30) Foreign Application Priority Data
Sep. 28, 2020 (JP) .............................. JP2020-162255

(51) Int. Cl.
*G03G 15/043* (2006.01)
(52) U.S. Cl.
CPC .................................. *G03G 15/043* (2013.01)
(58) Field of Classification Search
CPC . G03G 15/04; G03G 15/04072; G03G 15/043
See application file for complete search history.

(56) References Cited

U.S. PATENT DOCUMENTS

| | | | | |
|---|---|---|---|---|
| 2012/0230713 | A1* | 9/2012 | Sugiyama | G03G 15/011 399/51 |
| 2013/0235141 | A1* | 9/2013 | Onishi | G03G 15/04 347/118 |
| 2014/0086611 | A1* | 3/2014 | Nakagawa | H02M 3/33507 363/21.02 |
| 2020/0333723 | A1* | 10/2020 | Horiuchi | G03G 15/043 |
| 2021/0162773 | A1* | 6/2021 | Uehira | B41J 2/47 |

FOREIGN PATENT DOCUMENTS

| | | |
|---|---|---|
| JP | 2005-223770 A | 8/2005 |
| JP | 2013-043432 A | 3/2013 |

* cited by examiner

*Primary Examiner* — Carla J Therrien
(74) *Attorney, Agent, or Firm* — ScienBiziP, P.C.

(57) ABSTRACT

An image forming device includes an image data acquirer acquiring image data, a laser source emitting a laser beam, a laser driver forming an electrostatic latent image by irradiating a scanning surface of a charged photoconductor with the laser beam, based on the image data, a shading characteristic corrector correcting light quantity of the laser beam, an image former forming an image based on the electrostatic latent image, and a controller controlling the image data acquirer, the laser driver, the shading characteristic corrector, and the image former. The shading characteristic corrector includes a PDM signal outputter outputting a pulse density modulation signal based on the correction of the light quantity of the laser beam, a smoothing circuit smoothing the pulse density modulation signal to obtain an analog signal to be output, and a spread clock outputter outputting a clock subjected to spread spectrum to the PDM signal outputter.

3 Claims, 7 Drawing Sheets

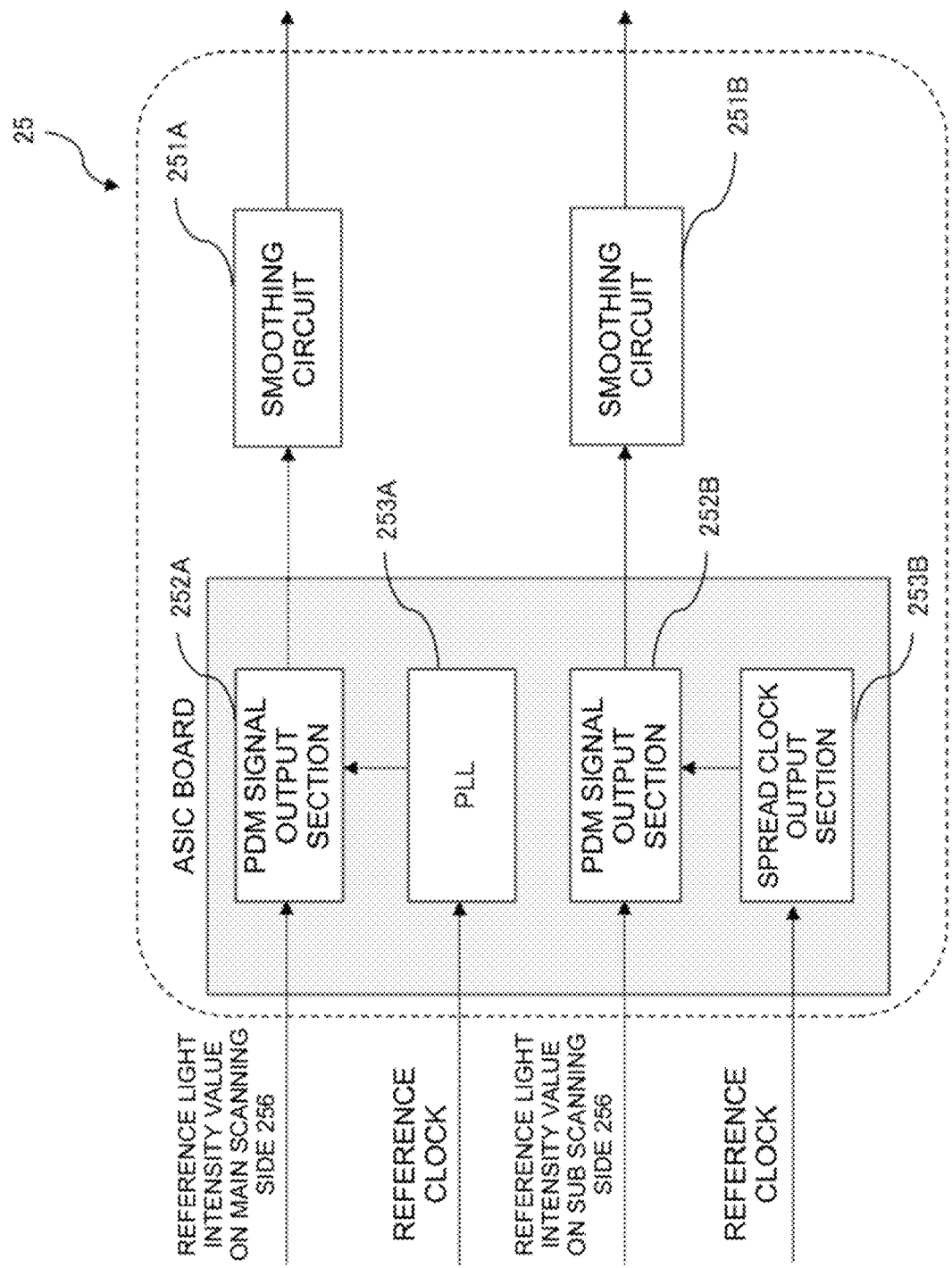

IMAGE FORMING DEVICE

BACKGROUND OF THE INVENTION

Field of the Invention

The present invention relates to an image forming device, and more particularly, to an image forming device including an optical scanning device that corrects shading characteristics.

Description of the Background Art

In general, image forming devices, such as laser printers, photocopiers, and facsimiles, including an optical scanning device that generates, to correct shading characteristics, an analog reference signal of light emission power of a semiconductor laser by smoothing a pulse density modulation signal with a low-pass filter have been used.

As a method for correcting such shading characteristics of laser intensity, the following method has been used. That is, a pulse density modulation (PDM) circuit and a smoothing circuit (e.g., a low-pass filter) are used to output a PDM wave based on a correction value, and the PDM wave is input to a laser source after being subjected to D/A conversion using the low-pass filter, so that an analog reference signal of light emission power of the semiconductor laser is changed (refer to Japanese Unexamined Patent Application Publication No. 2013-43432, for example).

However, the general method may not sufficiently suppress electromagnetic interference when a time constant of the low-pass filter is required to be reduced to improve responsiveness of the analog reference signal, when a frequency of a reference clock is increased to improve smoothness, or when the pulse density modulation circuit and the semiconductor laser driving circuit are different boards and harness transmission is required. Accordingly, this causes EMI (electromagnetic interference) deterioration.

Meanwhile, in an electronic apparatus using a clock output section, a method for controlling EMI caused by a clock signal by performing spread spectrum on the clock signal using a spread spectrum clock generator (SSCG) to address EMI has been used (refer to Japanese Unexamined Patent Application Publication No. 2005-223770, for example).

However, according to the general techniques, in laser control of an image forming device using high-frequency PDM waves, use of the SSCG may adversely affect print quality when an amount of variation of shading per unit time is large.

The present invention has been made in view of the above circumstances, and an object of the present invention is to provide an image forming device that reduces adverse effects of EMI caused by correction of shading characteristics during high frequency laser control.

SUMMARY OF THE INVENTION (1) According to the present invention, an image forming device includes an image data acquirer that acquires image data, a laser source that emits a laser beam, a laser driver that forms an electrostatic latent image by irradiating a scanning surface of a photoconductor in a charged state with the laser beam, based on the image data, a shading characteristic corrector that corrects light quantity of the laser beam, an image former that forms an image based on the electrostatic latent image, and a controller that controls the image data acquirer, the laser driver, the shading characteristic corrector, and the image former. The shading characteristic corrector includes a PDM signal outputter that outputs a pulse density modulation signal in accordance with the correction of the light quantity of the laser beam, a smoothing circuit that smooths the pulse density modulation signal to obtain an analog signal to be output, and a spread clock outputter that outputs a clock subjected to spread spectrum to the PDM signal outputter.

In the present invention, the "image forming device" is a device that forms and outputs an image, such as a photocopier having a copy function including a printer using an electrophotographic method for image formation with toner, and an MFP (Multi-Functional Peripheral) that also includes functions other than the copying.

According to the invention, since the shading characteristic corrector includes a PDM signal outputter that outputs a pulse density modulation signal in accordance with correction of light quantity of a laser beam, a smoothing circuit that smooths the pulse density modulation signal to obtain an analog signal to be output, and a spread clock outputter that outputs a clock subjected to the spread spectrum to the PDM signal outputter, an image forming device that reduces adverse effects of EMI associated with correction of shading characteristics during high frequency laser control may be realized.

Furthermore, preferred modes of the present invention will be described.

(2) In the image forming device according to the present invention, the controller may execute initialization of the image former at a predetermined timing, and the shading characteristic corrector may output a clock subjected to the spread spectrum to the PDM signal outputter only during the initialization.

In this way, the image forming device that reduces adverse effects of EMI caused by correction of shading characteristics during high-frequency laser control may be realized by turning on the spread clock outputter only during initialization in which reference light quantity value is constant and turning off the spread clock outputter during other modes such as printing.

(3) In the image forming device according to the present invention, the shading characteristic corrector may includes a main PDM signal outputter and a sub PDM signal outputter that output a pulse density modulation signal corresponding to correction of the light quantity of the laser beam in a main scanning direction and a pulse density modulation signal corresponding to correction of the light quantity of the laser beam in a sub-scanning direction, respectively, a main smoothing circuit and a sub smoothing circuit, and a spread clock outputter that outputs a clock subjected to the spread spectrum only to the sub PDM signal outputter.

In this way, by enabling the function of the spread clock outputter only in the case of a reference light quantity value (256) on a sub-scanning side that changes only at a relatively long time interval, an image forming device that reduces the adverse effects of EMI caused by the correction of the shading characteristics during high-frequency laser control may be realized.

BRIEF DESCRIPTION OF THE DRAWINGS

FIG. 7 is an explanatory diagram schematically showing a shading characteristic correction section of a digital multi-function peripheral according to a third embodiment of the present invention.

DESCRIPTION OF THE PREFERRED EMBODIMENTS

The present invention will now be described in detail with reference to the accompanying drawings. Note that the following explanations are given merely for describing examples in all respects, and should not be construed as limiting the present invention.

First Embodiment

Configuration of Digital Multi-Function Peripheral 1

A schematic configuration of a digital multi-function peripheral 1 according to a first embodiment of the present invention will be described below with reference to FIG. 1.

Figure 1:
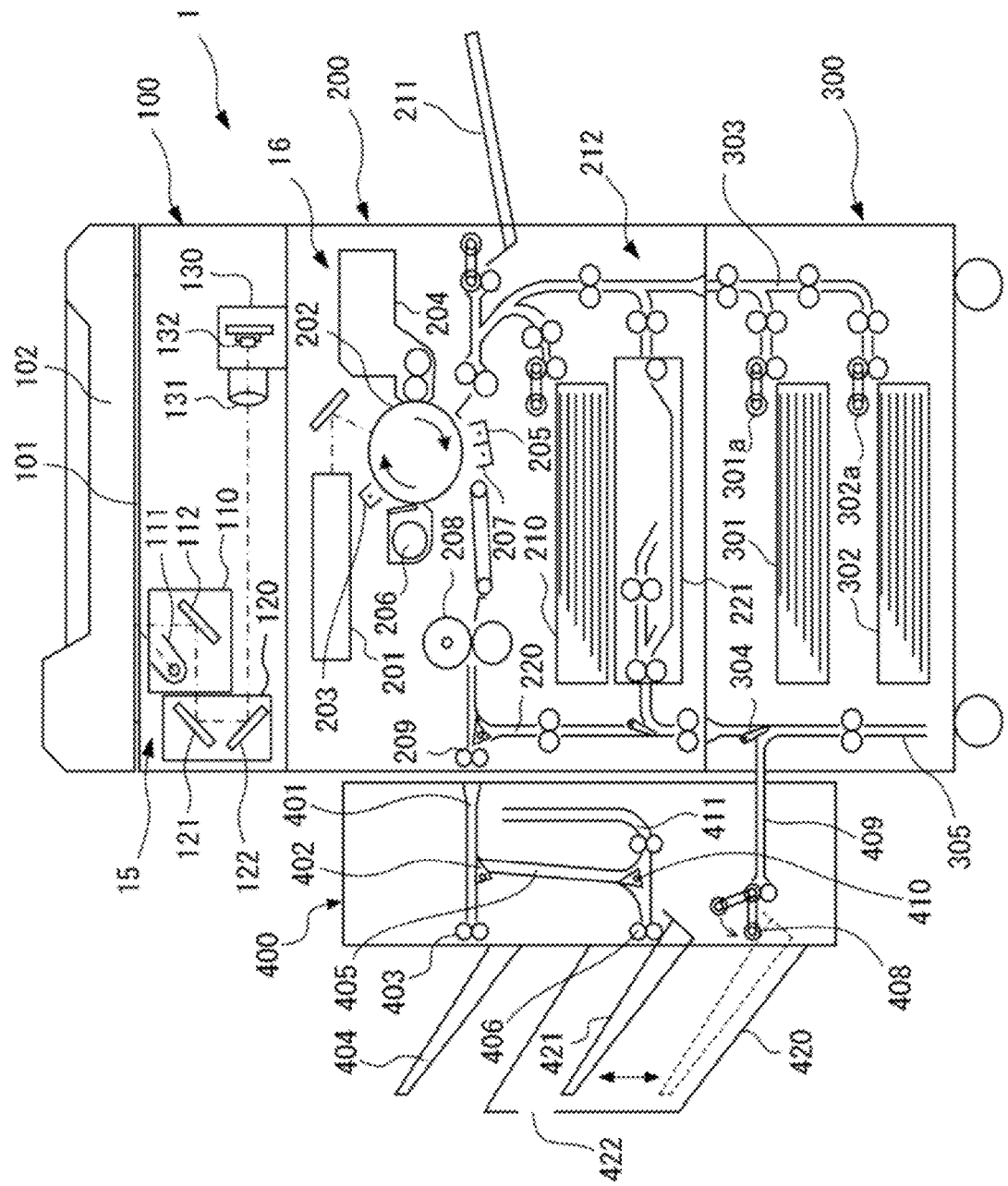
FIG. 1 is a cross-sectional view of a schematic configuration of a digital multi-function peripheral according to a first embodiment of the present invention.

FIG. 1 is a cross-sectional view of a schematic configuration of the digital multi-function peripheral 1 according to the first embodiment of the present invention.

As illustrated in FIG. 1, the digital multi-function peripheral 1 includes an image reading unit 100 that reads an image in a document so as to generate image data, an image forming unit 200 that forms an image on paper based on the image data, a paper feed unit 300 that accommodates paper to be fed and conveyed to the image forming unit 200, and a paper output unit 400 that ejects the paper having the image formed by the image forming unit 200.

The image reading unit 100 includes an image reading section 15 including a light source unit 110, a mirror unit 120, and a CCD (Charge Coupled Device) reading unit 130, and optically reads an image of a document placed on a platen glass document table 101 or a document conveyed from an automatic document transport device 102 that separates and feeds documents one by one.

The light source unit 110 includes a light source 111 that irradiates a document with light for reading, and a mirror 112 that is installed with its reflecting surface tilted at 45° with respect to a surface of the document table 101 to change a light path of reflected light from the document by 90°.

Furthermore, the light source unit 110 is configured to move in parallel to the surface of the document table 101 by a stepping motor, not shown in the figure, so as to scan a reading surface of the document placed on the document table 101.

The mirror unit 120 includes a pair of mirrors 121 and 122 arranged so that their reflecting surfaces are mutually orthogonal in order to further change, by 180°, the optical path of the reflected light that has been changed by 90° by the mirror 112 of the light source unit 110.

The CCD reading unit 130 includes an image forming lens 131 and a CCD sensor 132, and forms an image using the reflected light transmitted from the document through the light source unit 110 and the mirror unit 120 onto the CCD sensor 132 via the image forming lens 131.

The image formed on the CCD sensor 132 is extracted as an analog electric signal and converted to a digital signal by an AD converter not shown in the figure.

The converted digital signal is corrected for light distribution characteristics of the light source at a time of document reading, uneven sensitivity of the CCD sensor 132, and the like, and is then stored as image data in a digital form in an image memory (not shown) and supplied to the image forming unit 200.

The image forming unit 200 includes an image forming section 16 having a laser writing unit 201, a photoconductor drum 202, a charger 203, a developer 204, a transfer machine 205, a cleaner 206, a static eliminator 207, and the like, and forms an image on paper supplied and conveyed from a paper feed cassette 210 included inside the image forming unit 200, a manual feed tray 211 disposed on a side surface portion, or a paper feed unit 300 disposed on a lower portion of the image forming unit 200 based on image data generated by the image reading unit 100, image data obtained by developing a print job supplied from an external information processing apparatus (not shown), or image data obtained by decoding facsimile data supplied from an external facsimile device (not shown).

The paper feed unit 300 includes paper sheet cassettes 301 and 302 that accommodate a large amount of paper of various sizes. The paper accommodated in the paper sheet cassettes 301 and 302 is separated and supplied one by one by call rollers 301a and 302a in accordance with an instruction issued by the image forming unit 200, and is conveyed to the image forming section 16 of the image forming unit 200 through paper transport paths 303 and 212.

Operation of the image forming unit 200 will now be described. The image data is supplied to a storage section 18 (refer to FIG. 2) and stored in a predetermined storage area in the storage section 18. The stored image data is sequentially read out at a timing instructed by a controller 10 (refer to FIG. 2) and transferred to the laser writing unit 201, which is an optical writing device.

Figure 3:
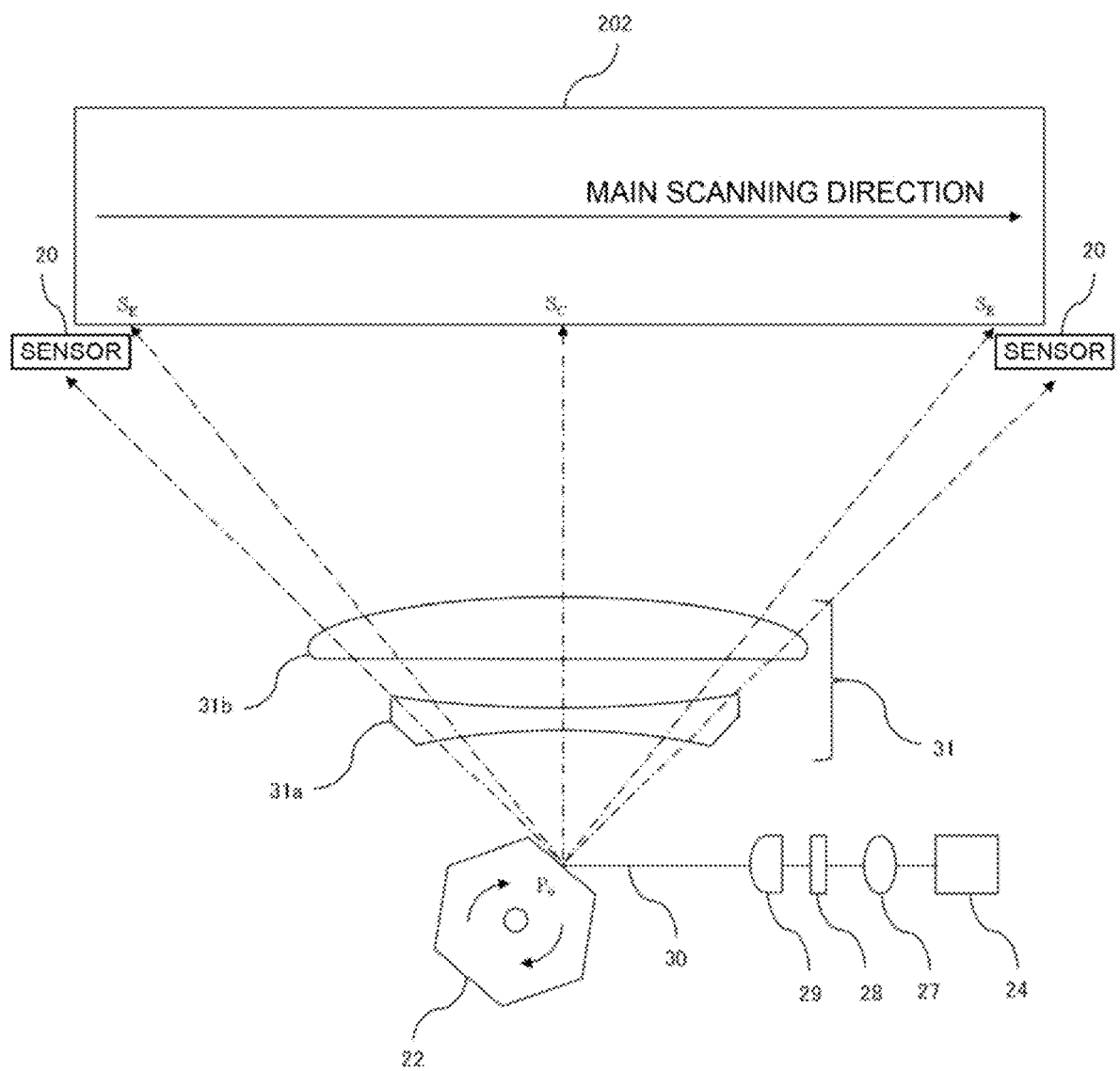
FIG. 3 is an explanatory diagram schematically showing a configuration of a laser writing unit of the digital multi-function peripheral illustrated in FIG. 1.

The laser writing unit 201 includes a semiconductor laser 24 that emits a laser beam according to the image data transferred from the storage section 18, a polygon mirror 22 that deflects the laser beam and scans a scanning surface of the photoconductor drum 202, a collimator lens 27, an aperture 28, and a cylindrical lens 29 (refer to FIG. 3). The laser writing unit 201 will be described in detail hereinafter.

The photoconductor drum 202 is surrounded by the charger 203 that charges the photoconductor drum 202 to a predetermined potential, the developer 204 that supplies toner to an electrostatic latent image formed on the photoconductor drum 202 to make the image visible, the transfer machine 205 that transfers a toner image formed on a surface of the photoconductor drum 202 onto paper transported from the paper feed cassette 210, the manual feed tray 211, or the paper feed unit 300, the static eliminator 207 that removes the electric charge from the paper on which the the toner image has been transferred and removes the paper from the photoconductor drum 202, and the cleaner 206 that collects the toner remaining after the toner image is transferred.

The paper having the transferred image is conveyed to the fusing unit 208, and the image is fused on the paper by the fusing unit 208. The paper having the fused image is supplied by a paper output roller 209 to the paper output unit 400.

Furthermore, the image forming unit 200 can also perform duplex printing by forming an image again on a back side of the paper on which the image has been formed.

Therefore, the image forming unit 200 includes a switchback path 220 for reversing front and back of the paper on which the image is formed and conveying the paper to the image forming section 16, and a duplex unit 221.

The switchback path 220 is disposed on an upstream of the paper output roller 209, and when the front and back of the paper are to be reversed, an edge of the paper is held by the paper output roller 209 once before the paper is fed to the paper output unit 400, and the paper output roller 209 is driven in reverse to convey the paper to the switchback path 220.

The paper is then conveyed to the image forming section 16 via the duplex unit 221 and the paper transport path 212 so that an image is formed on the back side of the paper.

Note that the switchback path 220 is used not only when image formation is performed on both sides of the paper, but also when the paper is ejected with the side of the formed image down.

The paper output unit 400 is disposed on a side part of the image forming unit 200. The paper output unit 400 has a paper output tray 404 for ejecting paper having an image thereon formed in accordance with a normal print job and a confidential tray 421 for ejecting paper having an image thereon formed in accordance with a print job associated with confidential print.

When the image forming unit 200 forms an image after receiving a print job that specifies normal print that is not confidential print, paper fed from the paper output roller 209 of the image forming unit 200 passes a paper transport path 401 and is ejected from a paper output roller 403 onto the paper output tray 404 of the paper output unit 400.

On the other hand, when the image forming unit 200 forms an image after receiving a print job that specifies confidential print, paper fed from the paper output roller 209 is guided to a paper transport path 405 by switching a switching gate 402 and ejected through a paper output roller 406 onto the confidential tray 421.

Note that a confidential box 420 is installed to surround the confidential tray 421 so that an image on the paper ejected onto the confidential tray 421 is not easily viewed from outside thereof.

Furthermore, a switchback gate 410 may be disposed on a downstream of the paper transport path 405 so that the paper to be ejected onto the confidential tray 421 is led to a switchback path 411 once and the paper is reversed and then ejected on the confidential tray 421.

The paper output unit 400 further includes an elevation movement mechanism (not shown) that moves the confidential tray 421 up and down. After paper is ejected onto the confidential tray 421, if a predetermined period of time elapses without removing the paper from a take-out port 422 provided on the confidential box 420, the elevation movement mechanism moves the confidential tray 421 downward and the movement is stopped when the confidential tray 421 reaches a predetermined position. The paper on the confidential tray 421 that has reached the predetermined position is taken in one by one by a call roller 408 and is conveyed to the paper feed unit 300 through a paper transport path 409. The paper conveyed to the paper feed unit 300 is led to a switchback path 305 by a switching gate 304, and then conveyed to the image forming unit 200 by switching a conveyance direction.

The paper is then led to the image forming section 16 through the duplex unit 221 and the paper transport path 212 of the image forming unit 200, and an image forming pattern for overwriting is overwritten in the image forming section 16.

Next, individual components of the digital multi-function peripheral 1 illustrated in FIG. 1 will be described.

Figure 2:
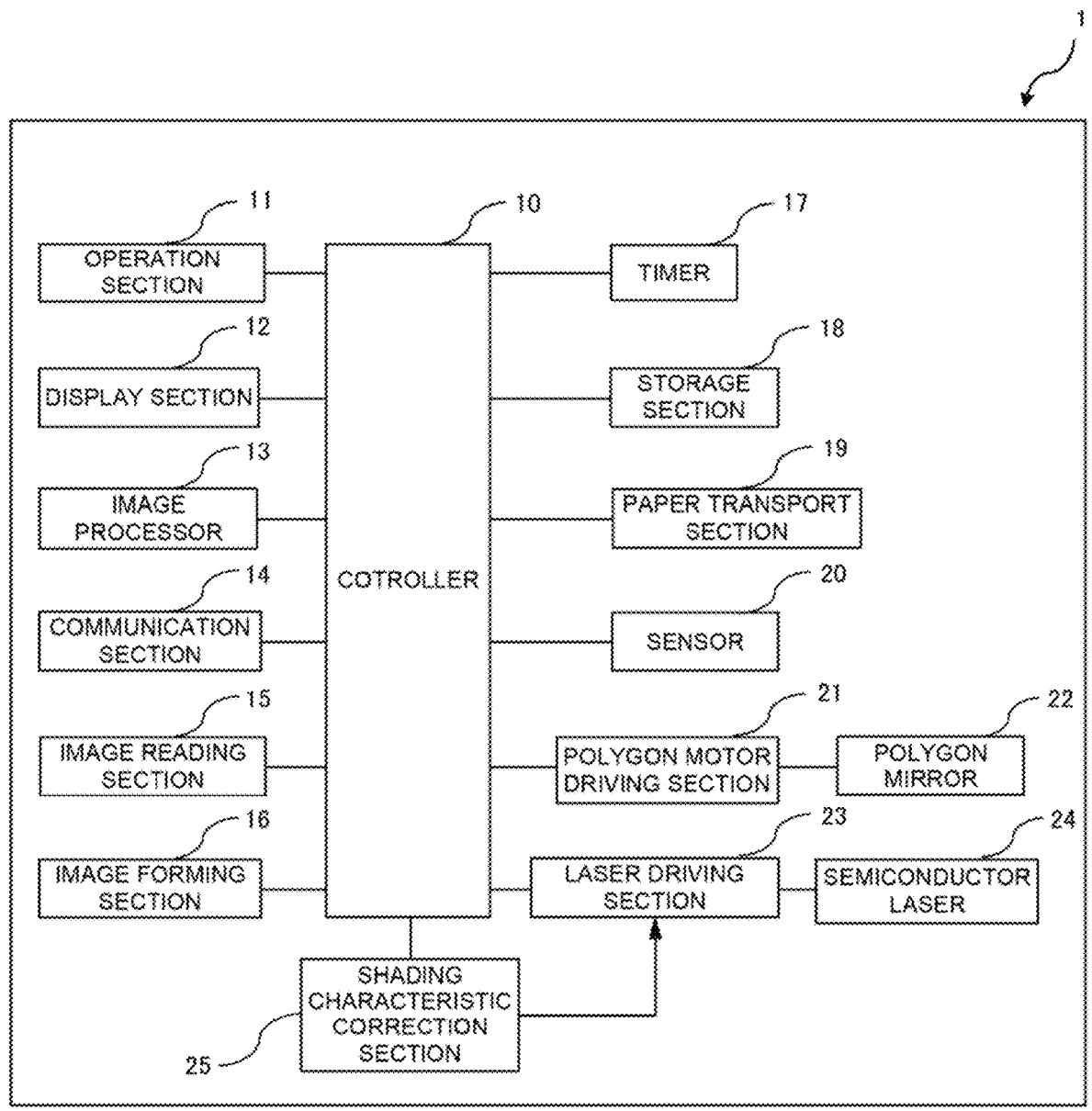
FIG. 2 is a block diagram schematically showing a configuration of the digital multi-function peripheral illustrated in FIG. 1.

FIG. 2 is a block diagram schematically illustrating a configuration of the digital multi-function peripheral 1 in FIG. 1.

As illustrated in FIG. 2, the digital multi-function peripheral 1 of the present invention includes the controller 10, an operation section 11, a display section 12, an image processor 13, a communication section 14, the image reading section 15, an image forming section 16, a timer 17, the storage section 18, a paper transport section 19, a sensor 20, a polygon motor driving section 21, the polygon mirror 22, a laser driving section 23, and a semiconductor laser 24.

Note that, in the first embodiment, an "image data acquirer" of the present invention is realized by the image reading section 15. A "laser source" is realized by the semiconductor laser 24.

The controller 10 controls operations of the individual components included in the digital multi-function peripheral 1. The controller 10 is primarily implemented by a microcomputer including a CPU (Central Processing Unit), a ROM (Read Only Memory), a RAM (Random Access Memory), an I/O (Input/Output) controller, and a timer.

The controller 10 organically operates various types of hardware on the basis of a control program stored in advance in the ROM or the like so as to execute a laser emission control function of the present invention described below.

Note that an ASIC (Application Specific Integrated Circuit) that is an integrated circuit designed and manufactured for a specific use and other circuits having an arithmetic function may be included as peripheral circuits.

The operation section 11 is an interface for operating the digital multi-function peripheral 1.

Examples of the operation section 11 include a keyboard and a mouse. In a case of a touch panel, the touch panel may be operated through the display section 12.

A user issues instructions to the digital multi-function peripheral 1 by operating the operation section 11.

The display section 12 displays various types of information. The display section 12 is configured by, for example, a CRT (Cathode Ray Tube) display, a liquid crystal display, or an EL (Electroluminescence) display, and is a display device, such as a monitor or a line display, for enabling an operating system or application software to display electronic data, such as processing states.

The image processor 13 converts a read document image into appropriate electric signals to generate image data, and performs processing to make image data supplied from the image reading section 15 suitable for output, such as size-enlargement or size-reduction, in accordance with an instruction issued by the operation section 11.

The communication section 14 communicates with a computer, a portable information terminal, an external information processing apparatus (not shown), a facsimile machine (not shown), or the like, via a network, etc., and transmits and receives various types of information, such as e-mails or facsimiles, to and from these external communication devices.

Using the light source 111 or the like, the image reading section 15 detects and reads a document placed on the document table 101 or a document conveyed from a document tray so as to generate image data. Furthermore, the image reading section 15 acquires image data generated by an external information processing apparatus or a facsimile machine. Note that, when image data is to be acquired from an external information processing apparatus or the like, the image data may be acquired via a wired or wireless network from an external facsimile machine or the like, or the image data recorded in a USB stick or the like may be acquired. Alternatively, these methods may be combined.

The image forming section 16 prints and outputs image data generated by the image processor 13 on paper.

The timer 17 measures elapsed times of various processes performed by the digital multi-function peripheral 1.

For example, the timer 17 is used to measure a detection timing of a writing position and an emission timing of the semiconductor laser 24.

The storage section 18 stores information required for realizing various functions of the digital multi-function peripheral 1 and programs, and examples of the storage section 18 include a semiconductor device, such as a RAM or a ROM and a storage medium, such as a hard disk or a flash memory.

The paper transport section 19 transports the paper stored in the paper feed cassette 210, the manual feed tray 211, and the paper sheet cassettes 301 and 302 to the image forming section 16 via the paper transport paths 212, 303, and the like.

The paper transport section 19 transports the paper having a toner image formed by the image forming section 16 to the fusing unit 208. The paper transport section 19 ejects the paper on which the toner image has been fused by the fusing unit 208 to the paper output tray 404 or the confidential tray 421 via the paper transport paths 401, 405, and 409. Furthermore, in a case of duplex printing, the paper transport section 19 reverses a front surface and a back surface of paper via the switchback path 220, 305, or 411 after image formation on the front surface of the paper is completed through the fusing unit 208.

The sensor 20 detects a writing position of a laser beam on the scanning surface.

The polygon motor driving section 21 drives a polygon motor to rotate the polygon mirror 22 at a constant angular velocity.

The polygon mirror 22 is a rotating polygonal mirror that has a polygonal prism shape, such as a hexagonal or octagonal prism, has mirrors on its sides, and rotates with a central axis of the polygonal prism. The polygon mirror 22 normally rotates approximately 20,000 to 30,000 times per minute.

A laser beam emitted from the semiconductor laser 24 is reflected by the polygon mirror 22 and deflected to the photoconductor drum 202.

The laser driving section 23 controls an emission timing of the semiconductor laser 24.

The laser driving section 23 converts a scanning speed of the laser beam reflected by a reflecting surface of the polygon mirror 22 from a constant angular velocity to a constant velocity.

The laser driving section 23 includes a shading characteristic correction section 25.

The shading characteristic correction section 25 corrects shading characteristics of laser intensity of the semiconductor laser 24. The shading characteristic correction section 25 will be described hereinafter in detail with reference to FIG. 5.

The semiconductor laser 24 irradiates the scanning surface of the photoconductor drum 202 with a laser beam to generate an electrostatic latent image.

Configuration of Laser Writing Unit 201 Next, a configuration of the laser writing unit 201 of the digital multi-function peripheral 1 will be described with reference to FIG. 3. FIG. 3 is an explanatory diagram schematically showing a configuration of the laser writing unit 201 of the digital multi-function peripheral 1 illustrated in FIG. 1.

Note that, although a laser beam emitted horizontally from the laser writing unit 201 is reflected by a mirror inclined at an angle so as to be incident on the photoconductor drum 202 from above at an angle in FIG. 1, the reflection by the mirror is omitted in FIG. 3 for convenience of explanation.

Furthermore, a horizontal axis indicates an axial direction (main scanning direction) of the photoconductor drum 202.

As illustrated in FIG. 3, the laser writing unit 201 includes the sensor 20, the semiconductor laser 24, a collimator lens 27, the aperture 28, the polygon mirror 22 and an fθ lens 31.

When scanning is started with a laser beam in the main scanning direction, the sensor 20 detects the laser beam.

When the sensor 20 detects the writing with the laser beam, the controller 10 drives the laser driving section 23 to emit the laser beam.

The collimator lens 27 adjusts a position of a focal point of the laser beam emitted from the semiconductor laser 24 and converts the laser beam into a collimated light beam.

The aperture 28 shapes the collimated light beam by allowing only a portion of the collimated light beam that has passed through the collimator lens 27 to pass so as to adjust light quantity.

The cylindrical lens 29 converges the laser beam in a direction corresponding to a sub-scanning direction and forms a line image so as to correct deviation of a dot pitch in the sub-scanning direction of the scanning surface of the photoconductor drum 202 caused by a tilt error (face tangle error) of the reflecting surface resulting from a processing error of the mirror surface of the polygon mirror 22, an inclination of the rotation axis of the polygon motor, or the like.

The fθ lens 31 including a spherical lens 31a and a toroidal lens 31b having a toric surface adjusts a focal distance so that a laser beam reflected by the reflecting surface of the polygon mirror 22 forms an image on the scanning surface of the photoconductor drum 202, and also converts a scanning speed of the laser beam from a constant angular velocity to a constant velocity.

In addition, the toroidal lens 31b cooperates with the cylindrical lens 29 to correct the face tangle error of the polygon mirror 22.

As shown in FIG. 3, the laser beam emitted from the semiconductor laser 24 passes through the collimator lens 27, the aperture 28, and the cylindrical lens 29 along an optical path 30, then is reflected by a mirror on a side surface of the polygon mirror 22, and passes through the fθ lens 31 to scan the scanning surface of the photoconductor drum 202 in the main scanning direction so as to form a dot-like electrostatic latent image at an equal pitch.

Note that, after the scanning for one line is completed, the controller 10 repeats the same process for the next scanning line in the sub-scanning direction.

Configuration of Shading Characteristic Correction Section 25C of General Digital Multi-function Peripheral 1

Next, a configuration of the shading characteristic correction section 25C of a general digital multi-function peripheral 1 will be described with reference to FIG. 4.

Figure 4:
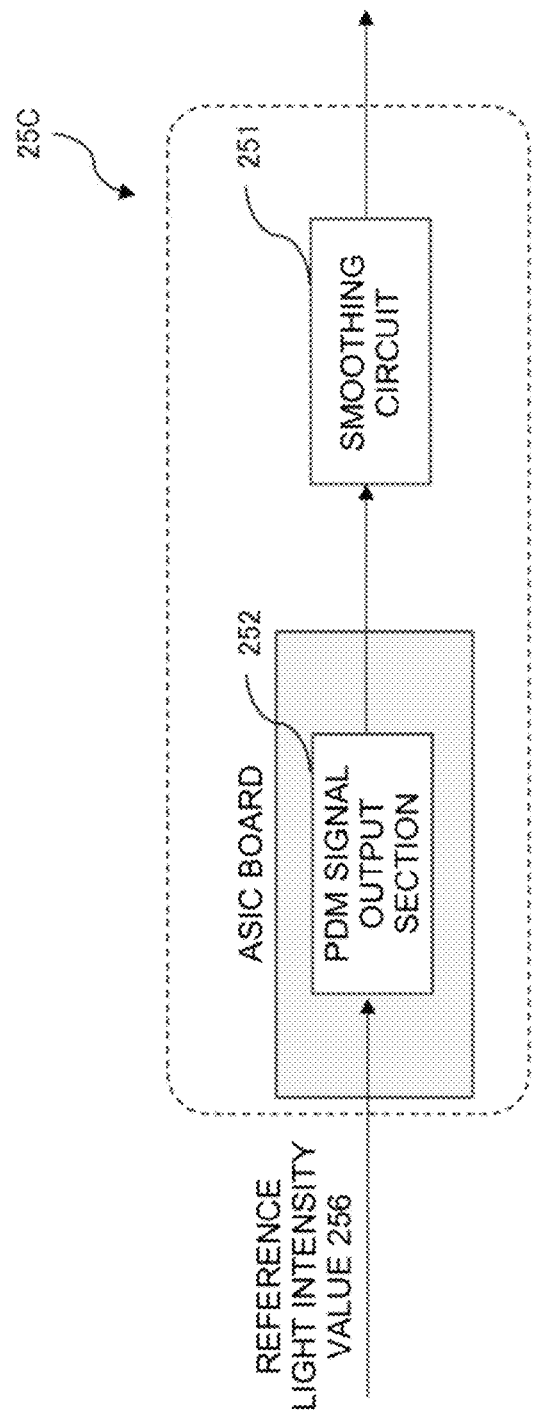
FIG. 4 is an explanatory diagram schematically showing a shading characteristic correction section of a general digital multi-function peripheral.

FIG. 4 is an explanatory diagram schematically illustrating the shading characteristic correction section 25C of the general digital multi-function peripheral 1.

As shown in FIG. 4, in general, the following method is used. That is, a PDM wave modulated by a PDM signal output section 252 disposed on an ASIC substrate is input to a laser source (light source 111) of the semiconductor laser 24 after being subjected to D/A conversion performed by the smoothing circuit 251, such as a low-pass filter, so that the shading characteristics of the laser intensity are corrected.

However, since an analog reference signal is generated by applying a low-pass filter to the pulse density modulation signal and smoothing the pulse density modulation signal in the general method, electromagnetic interference waves may not be sufficiently suppressed in the following cases (1) to (3), resulting in EMI deterioration.

Figure 5:
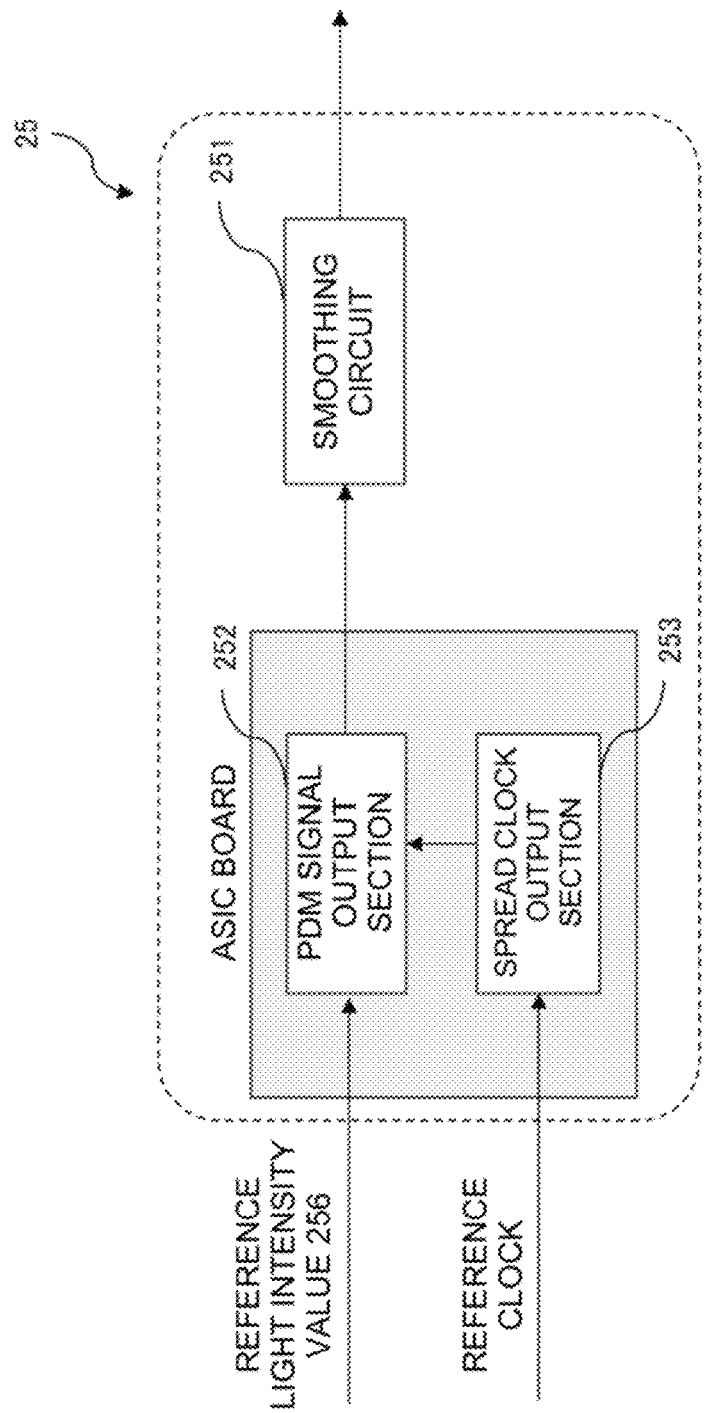
FIG. 5 is an explanatory diagram schematically showing a shading characteristic correction section of the digital multi-function peripheral 1 illustrated in FIG. 1.

(1) A case where reduction of a time constant of the low-pass filter is required in order to improve response of an analog reference signal (2) A case where a frequency of a reference clock is increased to improve smoothness (3) A case where the pulse density modulation circuit and the semiconductor laser driving circuit are different boards and harness transmission is required Configuration of Shading Characteristic Correction Section 25 of First Embodiment of Invention Next, a configuration of the shading characteristic correction section 25 of the digital multi-function peripheral 1 according to the first embodiment will be described with reference to FIG. 5.

FIG. 5 is an explanatory diagram schematically showing the shading characteristic correction section 25 of the digital multi-function peripheral 1 illustrated in FIG. 1.

In the present invention, in order to solve the problem of the general shading characteristic correction section 25C, a spread clock output section 253 is disposed on the ASIC board as illustrated in FIG. 4 so that spread spectrum is performed to address EMI.

A PLL (Phase Locked Loop) is used for the spread clock output section 253 to stabilize the laser control of the digital multi-function peripheral 1 that uses high frequency PDM waves with high accuracy.

In this way, by inputting a clock subjected to spread spectrum performed by the spread clock output section 253 to the PDM signal output section 252, a pulse in which spread spectrum is performed on a PDM signal on an output side is output, and accordingly, the digital multi-function peripheral 1 that reduces adverse effects of EMI caused by correction of the shading characteristics during high-frequency laser control may be realized.

Second Embodiment

Next, a configuration of a shading characteristic correction section 25 of a digital multi-function peripheral 1 according to a second embodiment will be described with reference to FIG. 6.

Figure 6:
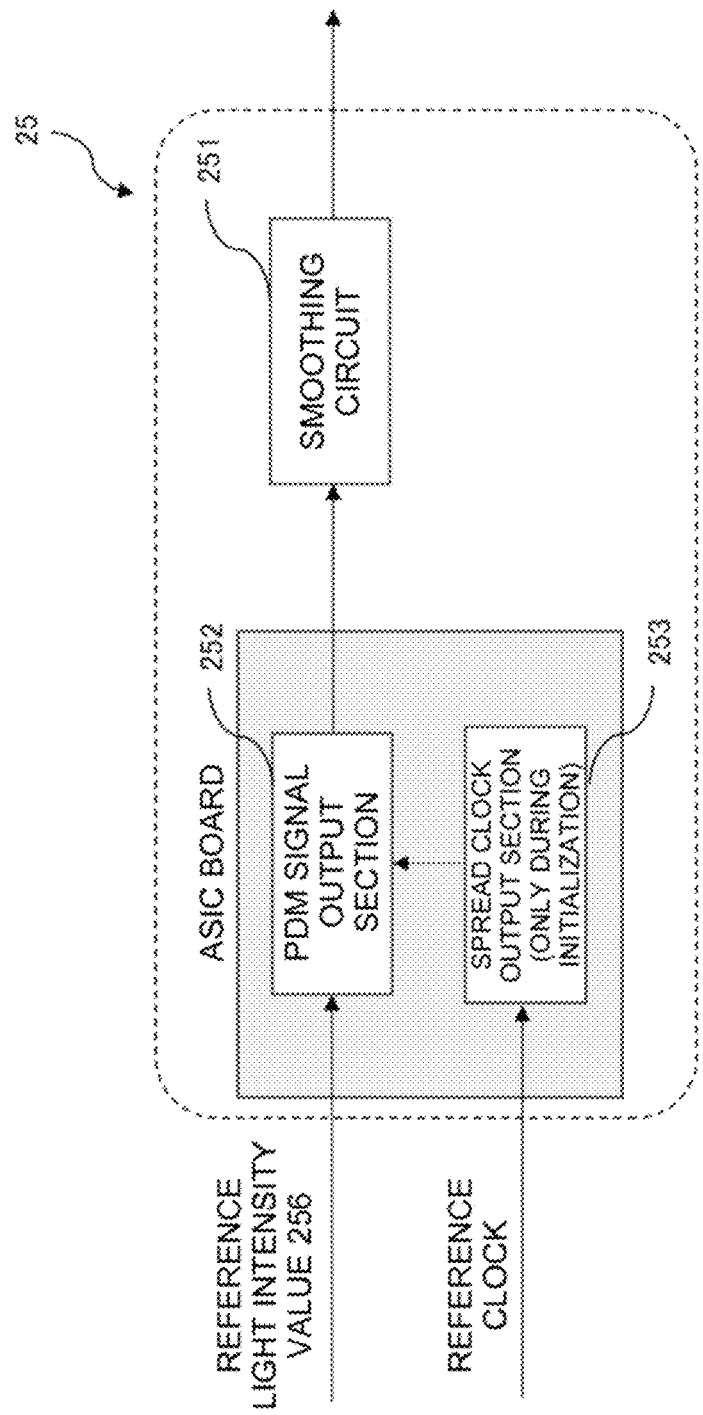
FIG. 6 is an explanatory diagram schematically showing a shading characteristic correction section of a digital multi-function peripheral according to a second embodiment of the present invention.

FIG. 6 is an explanatory diagram schematically illustrating the shading characteristic correction section 25 of the digital multi-function peripheral 1 according to the second embodiment of the present invention.

During a printing operation, spread spectrum is not essential because a reference light quantity value (256) varies in synchronization with a beam detection signal BD due to correction of shading characteristics of a laser beam.

When a spreading rate of spread spectrum is large, printing quality may be adversely affected in an area where an amount of variation per unit time of the correction of the shading characteristics in a main scanning direction is large.

Therefore, as shown in FIG. 6, in the second embodiment, the spread clock output section is turned on only during initialization in which a reference light quantity value is constant, and the spread clock output section is turned off during other modes such as printing.

In this way, the digital multi-function peripheral 1 that reduces adverse effects of EMI caused by correction of shading characteristics during high-frequency laser control may be realized by turning on the spread clock output section 253 only during initialization in which the reference light quantity value is constant and turning off the spread clock output section 253 during other modes such as printing.

Third Embodiment

Next, a configuration of a shading characteristic correction section 25 of a digital multi-function peripheral 1 according to a third embodiment will be described with reference to FIG. 7.

FIG. 7 is an explanatory diagram schematically showing the shading characteristic correction section 25 of the digital multi-function peripheral 1 according to the third embodiment of the present invention.

During a printing operation, spread spectrum is not essential because a reference light quantity value (256) on a main scanning side varies in synchronization with a beam detection signal BD due to correction of shading characteristics of a laser beam.

When a spreading rate of spread spectrum is large, printing quality may be adversely affected in an area where an amount of variation per unit time of the correction of the shading characteristics in a main scanning direction is large.

Therefore, as shown in FIG. 7, in the third embodiment, in order to enable a spread clock output function only in a case of a reference light quantity value (256) on the sub-scanning side which changes only in a relatively long time interval, the shading characteristic correction section 25 is disposed separately for the main scanning side and the sub-scanning side as shown in FIG. 6, and a spread clock output section 253B is provided only on the sub-scanning side.

In this way, by enabling the function of the spread clock output section 253B only in the case of the reference light quantity value (256) on the sub-scanning side that changes only at a relatively long time interval, the digital multi-function peripheral 1 that reduces the adverse effects of EMI caused by the correction of the shading characteristics during high-frequency laser control may be realized.

Preferred embodiments of the present invention also include combinations of the above-mentioned embodiments. Various modifications of the present invention may be implemented besides the above-described embodiments. Such modifications should not be construed as falling outside the scope of the present invention. The present invention is embodied by the claims and their equivalents, and should embrace all of the modifications within the scope of the above.

What is claimed is:

1. An image forming device comprising:
   an image data acquirer that acquires image data;
   a laser source that emits a laser beam;
   a laser driver that forms an electrostatic latent image by irradiating a scanning surface of a photoconductor in a charged state with the laser beam, based on the image data;
   a shading characteristic corrector that corrects light quantity of the laser beam;
   an image former that forms an image based on the electrostatic latent image; and
   a controller that controls the image data acquirer, the laser driver, the shading characteristic corrector, and the image former,
   wherein the shading characteristic corrector includes a PDM signal outputter that outputs a pulse density modulation signal in accordance with the correction of the light quantity of the laser beam, a smoothing circuit that smooths the pulse density modulation signal to obtain an analog signal to be output, and a spread clock outputter that outputs a clock subjected to spread spectrum to the PDM signal outputter.

2. The image forming device according to claim 1,
   wherein the controller executes initialization of the image former at a predetermined timing, and
   the shading characteristic corrector outputs a clock subjected to the spread spectrum to the PDM signal outputter only during the initialization.

3. The image forming device according to claim 1,
   wherein the PDM signal outputter includes a main PDM signal outputter and a sub PDM signal outputter that output a main pulse density modulation signal corresponding to correction of the light quantity of the laser beam in a main scanning direction and a sub pulse density modulation signal corresponding to correction of the light quantity of the laser beam in a sub-scanning direction, respectively,
   the smoothing circuit includes a main smoothing circuit and a sub smoothing circuit that smooth the main pulse density modulation signal and the sub pulse density modulation signal respectively to obtain analog signals to be output, and
   the spread clock outputter outputs a clock subjected to the spread spectrum only to the sub PDM signal outputter.

* * * * *